(12) United States Patent
Shuai et al.

(10) Patent No.: US 11,259,344 B2
(45) Date of Patent: Feb. 22, 2022

(54) NETWORK ARCHITECTURE AND INFORMATION EXCHANGE METHOD AND APPARATUS

(71) Applicant: HUAWEI TECHNOLOGIES CO., LTD., Guangdong (CN)

(72) Inventors: Yanglai Shuai, Shanghai (CN); Yu Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/935,804

(22) Filed: Jul. 22, 2020

(65) Prior Publication Data
US 2020/0351963 A1    Nov. 5, 2020

Related U.S. Application Data

(63) Continuation of application No. PCT/CN2018/115363, filed on Nov. 14, 2018.

(30) Foreign Application Priority Data

Jan. 23, 2018   (CN) .......................... 201810065499.2

(51) Int. Cl.
*H04W 76/10*       (2018.01)
*H04W 76/12*       (2018.01)

(52) U.S. Cl.
CPC .................................. *H04W 76/12* (2018.02)

(58) Field of Classification Search
CPC ..... H04W 76/12; H04W 84/10; H04W 84/12; H04W 76/10; H04W 76/11;
(Continued)

(56) References Cited

U.S. PATENT DOCUMENTS

2019/0059027 A1* 2/2019 Yang ................. H04W 36/0083
2019/0075552 A1* 3/2019 Yu ......................... H04W 72/04
(Continued)

FOREIGN PATENT DOCUMENTS

CN          106102106 A     11/2016

OTHER PUBLICATIONS

3GPP TR 38.806 V1.0.0 (Dec. 2017), 3rd Generation Partnership Project,Technical Specification Group Radio Access Network,Study of separation of NR Control Plane (CP) and User Plane (UP) for split option 2, (Release 15), 23 pages.
(Continued)

*Primary Examiner* — Andrew Wendell
(74) *Attorney, Agent, or Firm* — Fish & Richardson P.C.

(57) ABSTRACT

Methods, systems, and apparatus for information exchange are provided. In one aspect, an information exchange method includes establishing a link setup between a centralized unit-control plane (CU-CP) and a centralized unit-user plane (CU-UP) by at least one of sending a first link setup request to the CU-UP using an address of the CU-UP and receiving a first link setup response returned by the CU-UP; or receiving a second link setup request sent by the CU-UP based on an address of the CU-CP and returning a second link setup response to the CU-UP based on the second link setup request. The first and second link setup requests each carry at least one of an identifier of the CU-UP or a name of the CU-UP. The first and second link setup responses each carry at least one of an identifier of the CU-CP or a name of the CU-CP.

20 Claims, 9 Drawing Sheets

(58) Field of Classification Search
CPC .... H04W 12/037; H04L 67/28; H04L 67/322; H04B 3/544; H04B 7/18558
See application file for complete search history.

(56) References Cited

U.S. PATENT DOCUMENTS

2020/0275498 A1* 8/2020 Fiorani ................. H04W 76/11
2021/0084539 A1* 3/2021 Centonza ........... H04W 28/085

OTHER PUBLICATIONS

Ericsson, "New SID on Separation of CP and UP for split option 2", 3GPP TSG RAN Meeting #76, RP-171421, West Palm Beach, USA, Jun. 5-8, 2017, 4 pages.
Iaesi et al., "Architecture details of split gNB-CU", 3GPP TSG-RAN WG3 Meeting #97, R3-173624, Aug. 21-25, 2017, 4 pages.
Office Action issued in Chinese Application No. 201810065499.2 dated Jan. 19, 2020, 19 pages (With English Translation).
3GPP TR 38.806 V15.0.0 (Dec. 2017), "3rd Generation Partnership Project; Technical Specification Group Radio Access Network; Study of separation of NR Control Plane (CP) and User Plane (UP) for split option 2; (Release 15)," Dec. 2017, 22 pages.
Extended European Search Report issued in European Application No. 18903017.4 dated Feb. 8, 2021, 12 pages.
Huawei, "SgNB addition procedure for CP-UP separation," 3GPP TSG RAN WG3 meeting #98, R3-175033, Reno, Nevada, US, Nov. 27-Dec. 1, 2017, 3 pages.
Huawei, "TP on SgNB addition procedure for CP-UP separation," 3GPP TSG RAN WG3 meeting #97, R3-173124, Berlin, Germany, Aug. 21-25, 2017, 2 pages.
Nokia et al., "Change of CP-UP," 3GPP TSG-RAN WG3 Meeting #98, R3-174970, Reno, NV, USA, Nov. 27-Dec. 1, 2017, 3 pages.
Nokia et al., "E1 General functions and procedures," 3GPP TSG-RAN WG3 Meeting #98, R3-174370, Reno, NV, USA, Nov. 27-Dec. 1, 2017, 12 pages.

* cited by examiner

NETWORK ARCHITECTURE AND INFORMATION EXCHANGE METHOD AND APPARATUS

CROSS-REFERENCE TO RELATED APPLICATIONS

This application is a continuation of International Application No. PCT/CN2018/115363, filed on Nov. 14, 2018, which claims priority to Chinese Patent Application No. 201810065499.2, filed on Jan. 23, 2018. The disclosures of the aforementioned applications are hereby incorporated by reference in their entireties.

TECHNICAL FIELD

This application relates to the communications field, and in particular, to a network architecture and an information exchange method and apparatus.

BACKGROUND

Broadband wireless access technologies, represented by a wireless local area network WLAN and worldwide interoperability for microwave access WiMAX, can provide a high-rate broadband wireless access service and support a nomadic and mobile application, to greatly improve an access capability of wireless communications. Integration of a mobile communications network and a broadband wireless access technology is a trend of telecommunications network evolution.

In an evolved typical network structure, a terminal such as UE may access a network by using an access network, and set up, under control of a mobility management entity, a tunnel between the access network and a local serving gateway, and a tunnel between the local serving gateway and a data gateway, thereby establishing connectivity between the UE and a packet data network. In discussion of an existing next-generation radio access network architecture, a centralized control unit (Central Unit, CU) and a distributed control unit (Distributed Unit, DU) are evolved in a radio access network RAN. The CU decouples a user plane and a control plane, and a CU-control plane CP (CU-Control Plane, CU) and a CU-user plane UP (CU-User Plane, CU) are formed. The CU-CP and the CU-UP support flexible deployment.

However, to support user access, logical relationships between the CU-CP, the CU-UP, and the DU, and specific message exchange that needs to be performed between the CU-CP and the CU-UP need to be determined. However, the foregoing information is not clearly defined in a current next-generation network.

SUMMARY

Embodiments of this application provide a network architecture and an information exchange method and apparatus, to determine definitions of logical relationships between a CU-CP, a CU-UP, and a DU, and procedures of various services between the CU-CP, the CU-UP, and the DU.

In view of this, a first aspect of the embodiments of this application provides a network architecture, including:
a first CU-CP, M1 CU-UPs, and N1 DUs.
The first CU-CP is connected to the M1 CU-UPs, and a CU-CP connected to any one of the M1 CU-UPs is only the first CU-CP. To be specific, one CU-CP may be connected to one or more CU-UPs, and one CU-UP is connected to only one CU-CP. That is, the CU-CP and the CU-UP are in a one-to-many relationship.

The first CU-CP is connected to the N1 DUs, and a CU-CP connected to any one of the N1 DUs is only the first CU-CP. To be specific, one CU-CP may be connected to one or more DUs, and one DU is connected to only one CU-CP. That is, the CU-CP and the DU are in a one-to-many relationship.

Any one of the M1 CU-UPs is connected to at least one of the N1 DUs. and any one of the N1 DUs is connected to at least one of the M1 CU-UPs. To be specific, one CU-UP may be connected to one or more DUs, and one DU may also be connected to one or more CU-UPs. That is, the CU-UP and the DU are in a many-to-many relationship.

It should be noted that a dashed-line connection is a control plane connection, and a solid-line connection is a user plane connection.

A second aspect of the embodiments of this application provides a network architecture, including:
M2 CU-CPs, a first CU-UP, and N2 DUs.
The first CU-UP is connected to the M2 CU-CPs, and a CU-UP connected to any one of the M2 CU-CPs is only the first CU-UP. To be specific, one CU-UP may be connected to one or more CU-UPs, and one CU-UP is connected to only one CU-CP That is, the CU-CP and the CU-UP are in a many-to-one relationship.

Any one of the M2 CU-CPs is connected to at least one of the N2 DUs, and a CU-CP connected to any one of the N2 DUs is one of the M2 CU-CPs. To be specific, one CU-CP may be connected to one or more DUs, and one DU is connected to only one CU-CP. That is, the CU-CP and the DU are in a one-to-many relationship.

The first CU-UP is connected to the N2 DUs, and a CU-UP connected to any one of the N2 DUs is only the first CU-UP. To be specific, one CU-UP may be connected to one or more DUs, and one DU is connected to only one CU-UP. That is, the CU-UP and the DU are in a one-to-many relationship.

A third aspect of the embodiments of this application provides a network architecture, including:
M3 CU-CPs, N3 CU-UPs, and K DUs.
Any one of the N3 CU-UPs is connected to at least one of the M3 CU-CPs, and any one of the M3 CU-CPs is connected to at least one of the N3 CU-UPs. To be specific, one CU-UP may be connected to one or more CU-UPs, and one CU-UP may also be connected to one or more CU-CPs. That is, the CU-CP and the CU-UP are in a many-to-many relationship.

Any one of the M3 CU-CPs is connected to at least one of the N2 DUs, and a CU-CP connected to any one of the N2 DUs is one of the M2 CU-CPs. To be specific, one CU-CP may be connected to one or more DUs, and one DU is connected to only one CU-CP. That is, the CU-CP and the DU are in a one-to-many relationship.

Any one of the N3 CU-UPs is connected to at least one of the K DUs, and any one of the K DUs is connected to at least one of the N3 CU-UPs. To be specific, one CU-UP may be connected to one or more DUs, and one DU may also be connected to one or more CU-UPs. That is, the CU-UP and the DU are in a many-to-many relationship.

The logical structural relationships between the CU-CP, the CU-UP, and the DU are described above. The procedures of various services between the CU-CP, the CU-UP, and the DU are described below. A fourth aspect of the embodiments of this application provides an information exchange method, applied to the network architecture according to the foregoing aspects, and the method includes as follows:

A CU-CP obtains an address of a CU-UP. In some feasible embodiments, the CU-CP obtains an address of the CU-UP by using a domain name system or an operation and maintenance system configuration; may send a first link setup request to the CU-UP by using the address of the CU-UP, where the first link setup request carries an identifier of the CU-CP and/or a name of the CU-CP; and then receives a first link setup response returned by the CU-UP, where the first link setup response carries an identifier of the CU-UP and/or a name of the CU-UP, so that the CU-CP and the CU-UP complete link setup.

Alternatively, the CU-UP obtains an address of the CU-CP. In some feasible embodiments, the CU-UP obtains an address of the CU-CP by using the domain name system or the operation and maintenance system configuration; may send a first link setup request to the CU-CP by using the address of the CU-CP, where the first link setup request carries an identifier of the CU-UP and/or a name of the CU-UP; and then receives a first link setup response returned by the CU-CP, where the first link setup response carries an identifier of the CU-CP and/or a name of the CU-CP, so that the CU-UP and the CU-CP complete link setup.

According to the foregoing steps, a link setup procedure between the CU-CP and the CU-UP is determined, to support communication between base station nodes in a next-generation network and communication between next-generation core networks, thereby ensuring that a terminal can truly access the next-generation network.

In some feasible embodiments, after the CU-UP and the CU-CP complete the link setup, the method further includes:

when an attach procedure initiated by first UE is detected, the CU-CP may send a data bearer DRB setup request to the CU-UP, where the DRB setup request carries a to-be-configured evolved radio access bearer E-RAB setup list, and each entry in the to-be-configured E-RAB setup list includes an E-RAB identifier, an internet protocol IP address of a core network user plane function UPF, and a tunnel identifier of the UPF, so that the CU-UP sets up an uplink user plane tunnel between the CU-UP and the UPF based on the to-be-configured E-RAB setup list. Then, the CU-CP receives a DRB setup response returned by the CU-UP, where the DRB setup response includes an E-RAB setup list and a to-be-configured radio bearer RB setup list, each entry in the E-RAB setup list includes an E-RAB identifier, an IP address of the CU-UP, and a tunnel identifier of the CU-UP, and each entry in the to-be-configured RB setup list includes an RB identifier, the IP address of the CU-UP, and the tunnel identifier of the CU-UP. Then, the CU-CP sends the to-be-configured RB setup list to a DU, so that the DU sets up an uplink user plane tunnel to the CU-UP by using the to-be-configured RB setup list. Then, the CU-CP sends an RB setup list to the CU-UP, where each entry in the RB setup list includes an RB identifier, an IP address of the DU, and a tunnel identifier of the DU, so that the CU-UP sets up a downlink user plane tunnel to the DU based on the RB setup list. Finally, the CU-CP sends the E-RAB setup list to the UPF, so that the CU-UP sets up a downlink user plane tunnel to the UPF.

In some feasible embodiments, the data bearer DRB setup request includes security context information and a flow-level quality of service QoS list, the security context information includes an encryption algorithm, an integrity protection algorithm, and a security key, the security context information is used by the CU-UP to derive a user plane encryption protection key and an integrity protection key, each entry in the flow-level QoS list includes an RAB identifier and corresponding flow-level QoS, and the flow-level QoS list is used to notify the CU-UP of an RAB to be set up and corresponding QoS information.

In some feasible embodiments, the CU-CP sends the RB setup list by sending a DRB modification request to the CU-UP, where the DRB modification request carries the RB setup list.

In some feasible embodiments, each entry in the to-be-configured RB setup list further includes a packet data convergence protocol PDCP configuration of each RB.

In some feasible embodiments, the CU-CP sends an RB setup list by sending art RB bearer setup request to the DU, where the RB bearer setup request carries the to-be-configured RB setup list.

According to the foregoing steps, a user access procedure for the foregoing network architecture is determined, to support communication between base station nodes in a next-generation network and communication between next-generation core networks, thereby ensuring that a terminal can truly access the next-generation network.

In some feasible embodiments, the method further includes:

when the CU-UP receives a data flow and determines that a current RB cannot carry the data flow, receiving, by the CU-CP, a DRB setup indication sent by the CU-UP, where the DRB setup indication is used to indicate that the current RB resource cannot carry the data flow; and creating, by the CU-CP, a new RB resource as a first target RB to carry the data flow, or invoking, by the CU-CP, an existing RB resource as the first target RB to carry the data flow.

Specifically, in some feasible embodiments, the creating, by the CU-CP, a new RB resource as a first target RB includes:

sending, by the CU-CP, a DRB setup request to the CU-UP, where the DRB setup request includes an identifier of the first target RB and data flow level QoS corresponding to the first target RB; receiving, by the CU-CP, a DRB setup response returned by the CU-UP, where the DRB setup response includes an identifier of the target RB, the IP address of the CU-UP, and the tunnel identifier of the CU-UP; sending, by the CU-CP, the identifier of the first target RB, the IP address of the CU-UP, and the tunnel identifier of the CU-UP to the DU, so that the DU sets up an uplink user plane tunnel for the first target RB to the CU-UP; and finally sending, by the CU-CP, the identifier of the first target RB, the IP address of the DU, and the tunnel identifier of the DL to the CU-UP, so that the CU-UP sets up a downlink user plane tunnel to the DU.

In some feasible embodiments, the invoking, by the CU-CP, an existing RB resource as the RB includes:

sending, by the CU-CP, an RB modification request to the DU, where the RB modification request indicates that the RB is used to carry the data flow; and then receiving, by the CU-CP, an RB modification response returned by the DU.

According to the foregoing steps, a bearer modification procedure for the foregoing network architecture is determined, to support communication between base station nodes in a next-generation network and communication between next-generation core networks, thereby ensuring that a terminal can truly access the next-generation network.

In some feasible embodiments, the method further includes:

receiving, by the CU-CP, a handover request related to second UE; determining, by the CU-CP, a target CU-UP and a target DU that serve the second UE; sending, by the CU-CP, an identifier of a second target RB, an IP address of the target CU-UP, and a tunnel identifier of the target CU-UP to the target DU, so that the target DU sets up an uplink user plane tunnel to the target CU-UP by using the IP address of the target CU-UP and the tunnel identifier of the target CU-UP; obtaining, by the CU-CP, a tunnel identifier of the target DU and an IP address of the target DU; and finally sending, by the CU-CP, a path switch message to the target CU-UP, where the path switch message carries the identifier of the second target RB, the IP address of the target DU, and the tunnel identifier of the target DU, so that the target CU-UP sets up a downlink user plane tunnel to the target DU.

According to the foregoing steps, a handover procedure for the foregoing network architecture is determined, to support communication between base station nodes in a next-generation network and communication between next-generation core networks, thereby ensuring that a terminal can truly access the next-generation network.

A fifth aspect of the embodiments of this application provides an information exchange apparatus, including:

an obtaining module, configured to obtain an address of a CU-UP;

a sending module, configured to send a first link setup request to the CU-UP by using the address of the CU-UP, where the first link setup request carries an identifier of the CU-CP and/or a name of the CU-CP; and a receiving module, configured to receive a first link setup response returned by the CU-UP, where the first link setup response carries an identifier of the CU-UP and/or a name of the CU-UP, so that the CU-CP and the CU-UP complete link setup; or the receiving module is further configured to: when the CU-UP obtains an address of the CU-CP, receive, based on the address of the CU-CP, a second link setup request sent by the CU-UP, where the second link setup request carries an identifier of the CU-UP and/or a name of the CU-UP; and the sending module is further used by the CU-CP to return a second link setup response to the CU-UP based on the second link setup request, Where the second link setup response carries an identifier of the CU-CP and/or a name of the CU-CP, so that the CU-CP and the CU-UP complete link setup.

In some feasible embodiments, the obtaining module is specifically configured to obtain the address of the CU-CP by using a domain name system or an operation and maintenance system configuration.

In some feasible embodiments, the information exchange apparatus further includes:

the sending module is further configured to: when an attach procedure initiated by first UE is detected, send a data bearer DRB setup request to the CU-UP, where the DRB setup request carries a to-be-configured evolved radio access bearer E-RAB setup list, and each entry in the to-be-configured E-RAB setup list includes an E-RAB identifier, an internet protocol IP address of a core network user plane function UPF, and a tunnel identifier of the UPF, so that the CU-UP sets up an uplink user plane tunnel between the CU-UP and the UPF based on the to-be-configured E-RAB setup list;

the receiving module is further configured to receive a DRB setup response returned by the CU-UP, where the DRB setup response includes an E-RAB setup list and a to-be-configured radio bearer RB setup list, each entry in the E-RAB setup list includes an E-RAB identifier, an IP address of the CU-UP, and a tunnel identifier of the CU-UP, and each entry in the to-be-configured RB setup list includes an RB identifier, the IP address of the CU-UP, and the tunnel identifier of the CU-UP;

the sending module is further configured to send the to-be-configured RB setup list to a DU, so that the DU sets up an uplink user plane tunnel to the CU-UP by using the to-be-configured RB setup list;

the sending module is further configured to send an RB setup list to the CU-UP, where each entry in the RB setup list includes an RB identifier, an IP address of the DU, and a tunnel identifier of the DU, so that the CU-UP sets up a downlink user plane tunnel to the DU based on the RB setup list; and the sending module is further configured to send the E-RAB setup list to the UPF, so that the CU-UP sets up a downlink user plane tunnel to the UPF.

In some feasible embodiments, the data bearer DRB setup request includes security context information and a flow-level quality of service QoS list, the security context information includes an encryption algorithm, an integrity protection algorithm, and a security key, the security context information is used by the CU-UP to derive a user plane encryption protection key and an integrity protection key, each entry in the flow-level QoS list includes an RAB identifier and corresponding flow-level QoS, and the flow-level QoS list is used to notify the CU-UP of an RAB to be set up and corresponding QoS information.

In some feasible embodiments, the sending module is specifically configured to send a DRB modification request to the CU-UP, where the DRB modification request carries the RB setup list.

In some feasible embodiments, the sending module is further specifically configured to send an RB bearer setup request to the DU, where the RB bearer setup request carries the to-be-configured RB setup list.

In some feasible embodiments, the receiving module is further configured to: when the CU-UP receives a data flow and determines that a current RB cannot carry the data flow receive a DRB setup indication sent by the CU-UP, where the DRB setup indication is used to indicate that the current RB resource cannot carry the data flow.

In some feasible embodiments, if the apparatus creates a new RB resource as a first target RB to carry the data flow, the information exchange apparatus includes:

the sending module is further configured to send a DRB setup request to the CU-UP, where the DRB setup request includes an identifier of the first target RB and data flow level QoS corresponding to the first target RB;

the receiving module is further configured to receive a DRB setup response returned by the CU-UP, where the DRB setup response includes the identifier of the target RB, the IP address of the CU-UP, and the tunnel identifier of the CU-UP;

the sending module is further configured to send the identifier of the first target RB, the IP address of the CU-UP, and the tunnel identifier of the CU-UP to the DU, so that the DU sets up an uplink user plane tunnel for the first target RB to the CU-UP; and the sending module is further configured to send the identifier of the first target RB, the IP address of the DU, and the tunnel identifier of the DU to the CU-UP, so that the CU-UP sets up a downlink user plane tunnel to the DU.

In some feasible embodiments, if the apparatus invokes an existing RB resource as the first target RB to carry the data flow, the apparatus includes:

the sending module is further configured to send an RB modification request to the DU, where the RB modification request indicates that the RB is used to carry the data flow; and the receiving module is further configured to receive an RB modification response returned by the DU.

In some feasible embodiments, the receiving module is further configured to receive a handover request related to second UE, and the information exchange apparatus further includes:

a determining module, configured to determine a target CU-UP and a target DU that serve the second UE;

the sending module is further configured to send an identifier of a second target RB, an IP address of the target CU-UP, and a tunnel identifier of the target CU-UP to the target DU, so that the target DU sets up an uplink user plane tunnel to the target CU-UP by using the IP address of the target CU-UP and the tunnel identifier of the target CU-UP;

the obtaining module is further configured to obtain a tunnel identifier of the target DU and an IP address of the target DU; and the sending module is further configured to send a path switch message to the target CU-UP, where the path switch message carries the identifier of the second target RB, the IP address of the target DU, and the tunnel identifier of the target DU, so that the target CU-UP sets up a downlink user plane tunnel to the target DU.

A sixth aspect of the embodiments of this application provides an information exchange apparatus, including:

a processor and a memory.

The memory is configured to store a program. The processor invokes the program stored in the memory, to perform the method according to the foregoing aspects.

Another aspect of this application provides a computer-readable storage medium. The computer-readable storage medium stores an instruction. When the instruction is run on a computer, the computer is enabled to perform the method according to the foregoing aspects.

It can be learned from the foregoing technical solutions that the embodiments of this application have the following advantages:

In the embodiments of this application, the definitions of the logical relationships between the CU-CP, the CU-UP, and the DU are determined, to determine a network architecture of the next-generation network, and the link setup procedure, the user access procedure, the bearer modification procedure, and the handover procedure between the CU-CP and the CU-UP are determined, to support the communication between the base station nodes in the next-generation network and the communication between the next-generation core networks, thereby ensuring that the terminal can truly access the next-generation network.

DESCRIPTION OF EMBODIMENTS

Embodiments of this application provide a network architecture and an information exchange method and apparatus, to determine definitions of logical relationships between a CU-CP, a CU-UP, and a DU, and procedures of various services between the CU-CP, the CU-UP, and the DU.

To make persons skilled in the art better understand the solutions in the embodiments of this application, the following clearly and completely describes the technical solutions in the embodiments of this application with reference to the accompanying drawings in the embodiments of this application. Apparently, the described embodiments are merely some rather than all of the embodiments of this application.

In the specification, claims, and accompanying drawings of this application, the terms "first", "second", "third", "fourth", and the like (if existent) are intended to distinguish similar objects but do not need to be used to describe a specific order or sequence. It should be understood that the data used in such a way are interchangeable in proper circumstances, so that the embodiments described herein can be implemented in another order than the order illustrated or described herein. Moreover, the terms "include", "contain" and any other variants mean to cover the non-exclusive inclusion, for example, a process, method, system, product, or device that includes a list of steps or units is not necessarily limited to the expressly listed steps or units, but may include other steps or units not expressly listed or inherent to such a process, method, system, product, or device.

Currently, broadband wireless access technologies such as a wireless local area network WLAN and worldwide interoperability for microwave access WiMAX can provide a high-rate broadband wireless access service, and can support a nomadic and mobile application, to greatly improve an access capability of wireless communications, thereby integrating a mobile communications network with a broadband wireless access technology. In an evolved typical network structure, a terminal such as UE may access a network by using an access network, and set up, under control of a mobility management entity, a tunnel between the access network and a local serving gateway, and a tunnel between the local serving gateway and a data gateway, thereby establishing connectivity between the UE and a packet data network.

Figure 1:
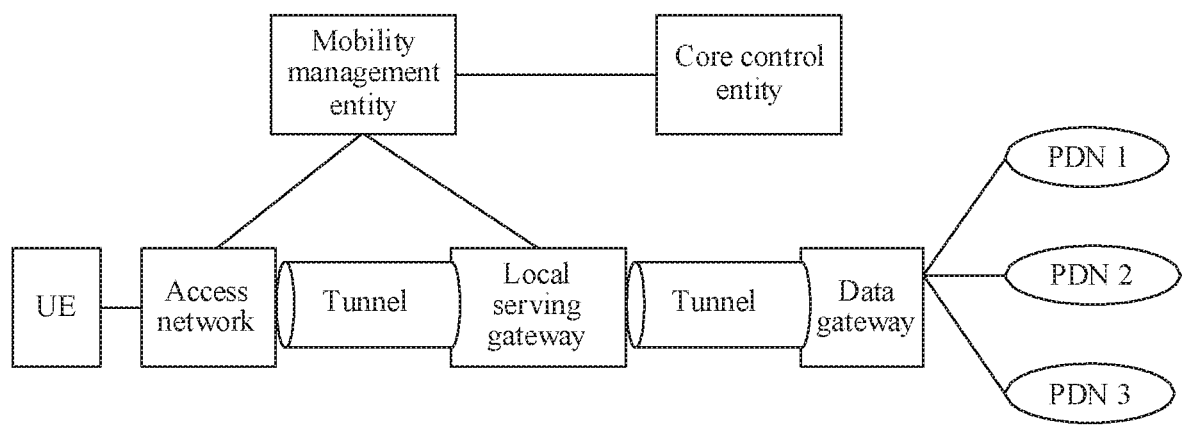
FIG. 1 is a schematic diagram of a typical network structure of an evolved network.

Specifically, FIG. 1 shows a typical network structure of an evolved network, including UE, an access network, a mobility management entity, a core control entity, a local serving gateway, a data gateway, and a plurality of packet data networks PDNs: a PDN 1, a PDN 2, and a PDN 3 respectively.

The UE may access a network by using the access network, and set up, under control of the mobility management entity, a tunnel between the access network and the local serving gateway, and a tunnel between the local serving gateway and the data gateway, thereby establishing connectivity between the UE and the plurality of PDNs. Herein, a tunnel may also be directly set up between the UE and the data gateway. This is not limited herein.

It should be noted that the UE in this embodiment of this application may be a device providing voice and/or data connectivity to a user, a handheld device having a wireless connection function, or another processing device connected to a wireless modem. A wireless terminal may communicate with one or more core networks by using a radio access network (RAN Radio Access Network). The wireless terminal may be a mobile terminal, for example, a mobile phone (also referred to as a "cellular" phone) and a computer having a mobile terminal, for example, may be a portable, pocket-sized, handheld, computer built-in, or in-vehicle mobile apparatus, which exchanges voice and/or data with the radio access network.

The access network in this embodiment of this application is formed by a series of transport entities (for example, a line device and a transmission facility) between a service node interface SNI and a user-to-network interface UNI, is an implementation system that provides a required transport bearer capability for feeding a telecommunication service, and may be configured and managed by using a management interface (Q3). In principle, types and quantities of UNIs and SNIs that can be implemented by the access network are not limited. The access network may not interpret signaling and can be considered as a transport network unrelated to a service and an application. The access network mainly implements cross-connection, multiplexing, and transmission functions.

In this embodiment of this application, the mobility management entity may be responsible for managing UE location information, access authentication, non-access stratum signaling, signaling security, and the like. The local serving gateway may be a data anchor for small-scale mobility of the UE, is an interface entity of a core network and an access network, and is responsible for routing and forwarding of user data. The core control entity is an entity that records and manages user location information and authentication and authorization information.

It should be noted that a principle of tunneling is to implement secure transmission and routing of data between two endpoint entities by encapsulating a protocol packet transmitted between the two endpoint entities of the tunnel by using another protocol. In some feasible embodiments, to effectively manage and use a network resource, a complete network management and control mechanism for a telecommunications network may be set up, so that when a terminal exits a network, a resource allocated to the user needs to be released in a timely manner, including radio channels, bearers, tunnels, stored information, and the like.

In some feasible embodiments, the user equipment may be supported in accessing one or more packet data services, the packet data service is identified by using an access point name (Access Point Name, APN), a network side may establish connectivity from the user to a corresponding data gateway based on the APN, and then, the data gateway establishes connectivity to a corresponding PDN based on the APN. In this case, the APN of the packet data service that the user needs to access may be preconfigured on the network side, or may be provided by the user equipment to the network side. This is not limited herein.

Figure 2:
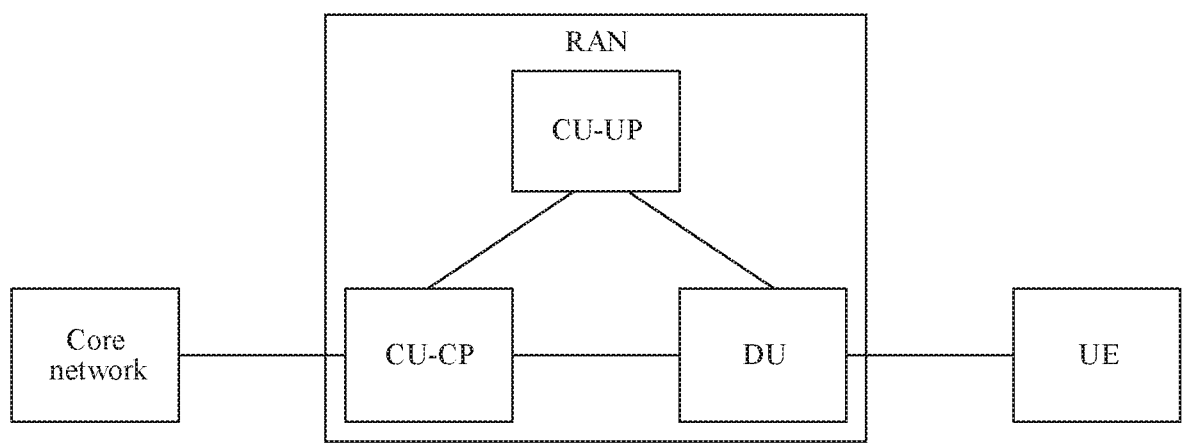
FIG. 2 is a schematic diagram of a network architecture of a next-generation radio access network.

FIG. 2 shows a network architecture of a next-generation radio access network, including a core network, a radio access network (Radio Access Network, RAN), and UE. In discussion of an existing next-generation radio access network architecture, a centralized control unit (Central Unit, CU) and a distributed control unit (Distributed Unit, DU) are evolved in the radio access network RAN. The CU decouples a user plane and a control plane, and a CU-control plane CP (CU-Control Plane, CU) and a CU-user plane UP (CU-User Plane, CU) are formed. The CU-CP and the CU-UP support flexible deployment.

However, to support user access, logical relationships between the CU-CP, the CU-UP, and the DU, and specific message exchange that needs to be performed between the CU-CP and the CU-UP need to be determined. However, the foregoing information is not clearly defined in a current next-generation network.

In the embodiments of this application, definitions of logical relationships between the CU-CP, the CU-UP, and the DU are determined, to determine a network architecture of a next-generation network, and a link setup procedure, a user access procedure, a bearer modification procedure, and a handover procedure between the CU-CP and the CU-UP are determined, to support communication between base station nodes in the next-generation network and communication between next-generation core networks, thereby ensuring that the terminal can truly access the next-generation network.

Figure 3:
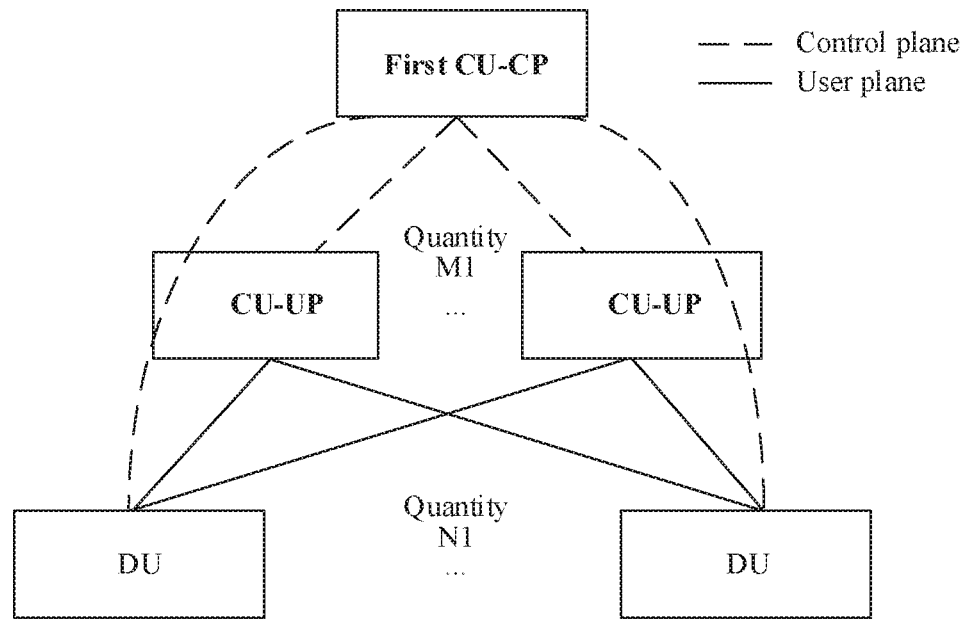
FIG. 3 is a schematic diagram of a network architecture according to an embodiment of this application.

For ease of understanding, a specific network architecture in an embodiment of this application is described below. Referring to FIG. 3, a network architecture provided in an embodiment of this application includes:

a first CU-CP, M1 CU-UPs, and N1 DUs.

The first CU-CP is connected to the M1 CU-UPs, and a CU-CP connected to any one of the M1 CU-UPs is only the first CU-CP. To be specific, one CU-CP may be connected to one or more CU-UPs, and one CU-UP is connected to only one CU-CP. That is, the CU-CP and the CU-UP are in a one-to-many relationship.

The first CU-CP is connected to the N1 DUs, and a CU-CP connected to any one of the N1 DUs is only the first CU-CP. To be specific, one CU-CP may be connected to one or more DUs, and one DU is connected to only one CU-CP. That is, the CU-CP and the DU are in a one-to-many relationship.

Any one of the M1 CU-UPs is connected to at least one of the N1 DUs, and any one of the N1 DUs is connected to at least one of the M1 CU-UPs. To be specific, one CU-UP may be connected to one or more DUs, and one DU may also be connected to one or more CU-UPs. That is, the CU-UP and the DU are in a many-to-many relationship.

It should be noted that a dashed-line connection is a control plane connection, and a solid-line connection is a user plane connection.

Figure 4:
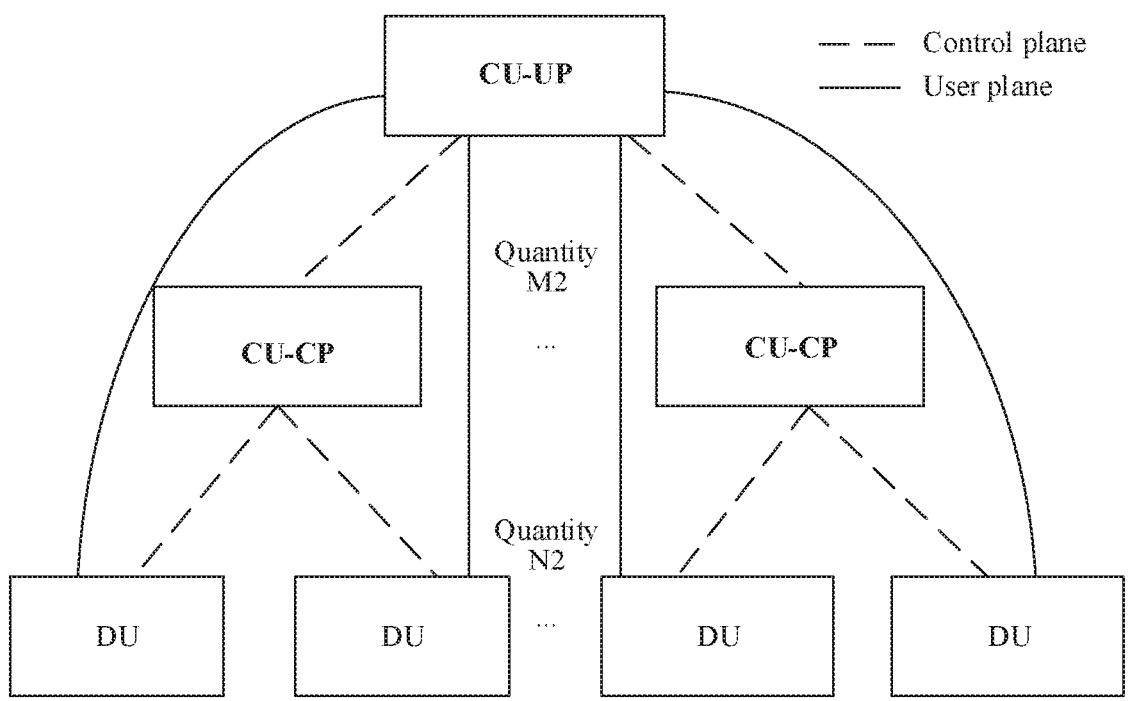
FIG. 4 is a schematic diagram of another network architecture according to an embodiment of this application.

Referring to FIG. 4, another network architecture provided in an embodiment of this application includes:

M2 CU-CPs, a first CU-UP, and N2 DUs.

The first CU-UP is connected to the M2 CU-CPs, and a CU-UP connected to any one of the M2 CU-CPs is only the first CU-UP. To be specific, one CU-UP may be connected to one or more CU-UPs, and one CU-UP is connected to only one CU-CP. That is, the CU-CP and the CU-UP are in a many-to-one relationship.

Any one of the M2 CU-CPs is connected to at least one of the N2 DUs, and a CU-CP connected to any one of the N2 DUs is one of the M2 CU-CPs. To be specific, one CU-CP may be connected to one or more DUs, and one DU is connected to only one CU-CP. That is, the CU-CP and the DU are in a one-to-many relationship.

The first CU-UP is connected to the N2 DUs, and a CU-UP connected to any one of the N2 DUs is only the first CU-UP. To be specific, one CU-UP may be connected to one or more DUs, and one DU is connected to only one CU-UP. That is, the CU-UP and the DU are in a one-to-many relationship.

Figure 5:
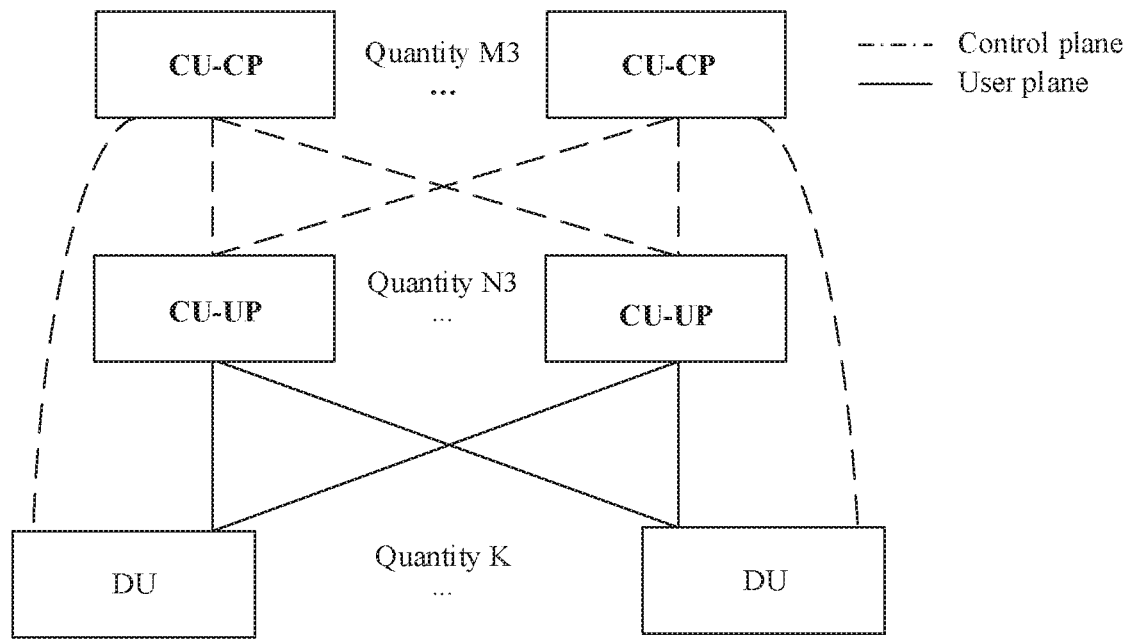
FIG. 5 is a schematic diagram of another network architecture according to an embodiment of this application.

Referring to FIG. 5, another network architecture provided in an embodiment of this application includes:

M3 CU-CPs, N3 CU-UPs, and K DUs.

Any one of the N3 CU-UPs is connected to at least one of the M3 CU-CPs, and any one of the M3 CU-CPs is connected to at least one of the N3 CU-UPs. To be specific, one CU-UP may be connected to one or more CU-UPs, and one CU-UP may also be connected to one or more CU-CPs. That is, the CU-CP and the CU-UP are in a many-to-many relationship.

Any one of the M3 CU-CPs is connected to at least one of the N2 DUs, and a CU-CP connected to any one of the N2 DUs is one of the M2 CU-CPs. To be specific, one CU-CP may be connected to one or more DUs, and one DU is connected to only one CU-CP. That is, the CU-CP and the DU are in a one-to-many relationship.

Any one of the N3 CU-UPs is connected to at least one of the K DUs, and any one of the K DUs is connected to at least one of the N3 CU-UPs. To be specific, one CU-UP may be connected to one or more DUs, and one DU may also be connected to one or more CU-UPs. That is, the CU-UP and the DU are in a many-to-many relationship.

Figure 6:
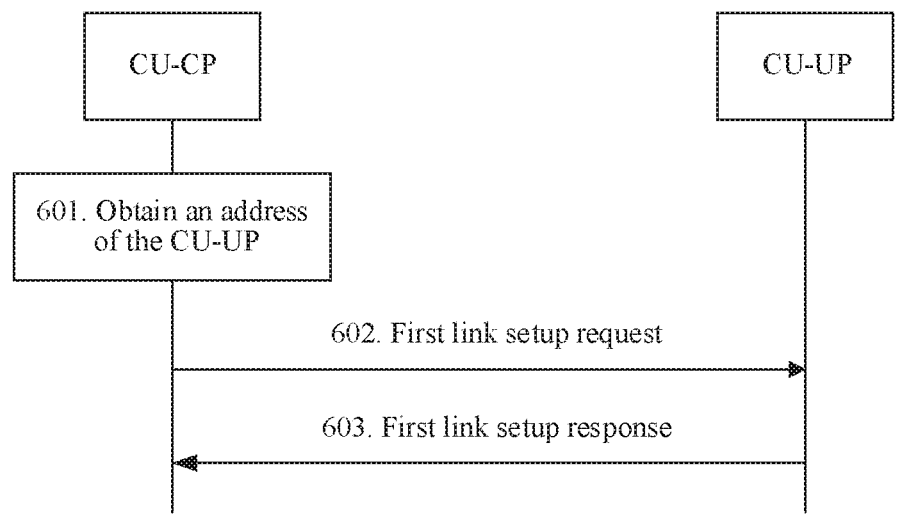
FIG. 6 is a schematic diagram of an information exchange method according to an embodiment of this application.

The logical structural relationships between the CU-CP, the CU-UP, and the DU are described above. Procedures of various services between the CU-CP, the CU-UP, and the DU are described below. Referring to FIG. 6, an information exchange method provided in an embodiment of this application is used for link configuration between the CU-CP and CU-UP, and includes the following steps.

601. The CU-CP obtains an address of the CU-UP by using a domain name system DNS, or by using an operation and maintenance system configuration.

In this embodiment of this application, the CU-CP may obtain the address of the CU-UP Specifically, the address may be obtained by using the domain name system (Domain Name System, DNS), or may be obtained by using the operation and maintenance system configuration. It should be noted that, the DNS mentioned in this embodiment of this application is used on the Internet as a distributed database in which a domain name and an IP address are mapped to each other, so that a user can have more convenient access to the Internet without remembering an IP bit string that can be directly read by a machine. A process of obtaining an IP address corresponding to a host name simply by using the host name is referred to as domain name resolution (or host name resolution). In some feasible embodiments, the CU-CP may further configure the address of the CU-UP by using the operation and maintenance system. This is not limited herein.

602. The CU-CP sends a first link setup request to the CU-UP by using the address of the CU-UP.

In this embodiment of this application, after obtaining the address of the CU-UP, the CU-CP may send the first link setup request to the CU-UP by using the address, to set up a link between the CU-CP and the CU-UP. In some feasible embodiments, the first link setup request may carry an identifier of the CU-CP and/or a name of the CU-CP, so that when the CU-UP needs to reply to a message, the identifier of the CU-CP and/or the name of the CU-CP may be directly used to reply to the message.

603. The CU-UP returns a first link setup response to the CU-CP.

In this embodiment of this application, when receiving the first link setup request sent by the CU-CP and obtaining the identifier of the CU-CP and/or the name of the CU-CP, the CU-UP may determine an address of the CU-CP by using the identifier of the CU-CP and/or the name of the CU-CP, and return the first link setup response related to the first link setup request. When the CU-CP receives the first link setup response, the CU-CP and the CU-UP complete link setup. In some feasible embodiments, the first link setup response carries an identifier of the CU-UP and/or a name of the CU-UP, to facilitate subsequent information exchange.

Figure 7:
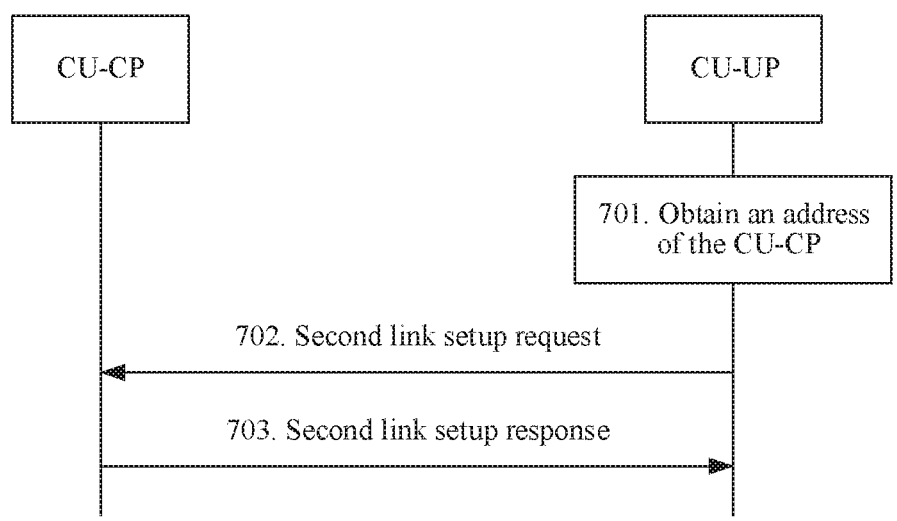
FIG. 7 is a schematic diagram of another information exchange method according to an embodiment of this application.

In some feasible embodiments, referring to FIG. 7, an information exchange method provided in an embodiment of this application is used in a user access procedure, and includes the following steps.

701. The CU-UP obtains an address of the CU-CP by using a DNS, or by using an operation and maintenance system configuration.

In some feasible embodiments, the CU-CP may obtain an address of the CU-UP to actively set up a link, or the CU-UP may obtain the address of the CU-CP to actively set up a link. Similarly, the CU-UP may alternatively obtain the address of the CU-CP by using the DNS, or configure the address of the CU-CP by using the operation and maintenance system. This is not limited herein.

702. The CU-UP sends a second link setup request to the CU-CP based on the address of the CU-CP, where the second link setup request carries an identifier of the CU-UP and/or a name of the CU-UP.

In this embodiment of this application, after obtaining the address of the CU-CP, the CU-UP may send the second link setup request to the CU-CP by using the address, to set up a link between the CU-UP and the CU-CP. In some feasible embodiments, the second link setup request may carry the identifier of the CU-UP and/or the name of the CU-UP, so that when the CU-CP needs to reply to a message, the identifier of the CU-UP and/or the name of the CU-UP may be directly used to reply to the message.

703. The CU-CP returns a second link setup response to the CU-UP based on the second link setup request, where the second link setup response carries an identifier of the CU-CP and/or a name of the CU-CP, so that the CU-CP and the CU-UP complete link setup.

In this embodiment of this application, when receiving the first link setup request sent by the CU-UP and obtaining the identifier of the CU-UP and/or the name of the CU-UP, the CU-CP may determine the address of the CU-UP by using the identifier of the CU-UP and/or the name of the CU-UP, and return the second link setup response related to the second link setup request. When the CU-UP receives the second link setup response, the CU-UP and the CU-CP complete link setup. In some feasible embodiments, the second link setup response carries the identifier of the CU-CP and/or the name of the CU-CP, to facilitate subsequent information exchange.

Figure 8:
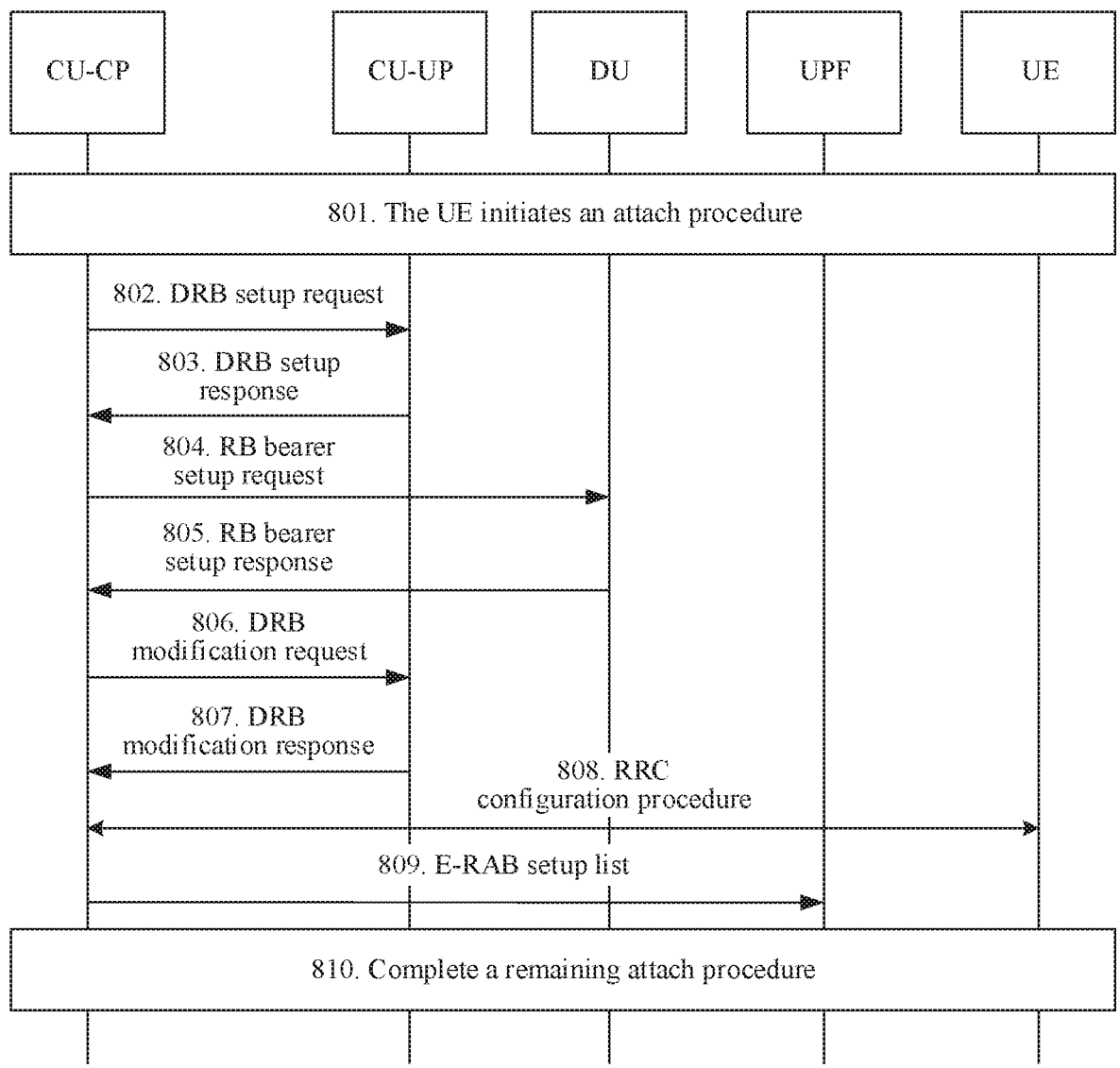
FIG. 8 is a schematic diagram of another information exchange method according to an embodiment of this application.

After the link between the CU-CP and the CU-UP is successfully set up, user access may be received. Referring to FIG. 8, an information exchange method provided in an embodiment of this application is used to receive user access, and includes the following steps.

801. Detect an attach procedure initiated by first UE.

In some feasible embodiments, when a terminal is powered on, or is switched from a state of no signal to a state of a signal, or is handed over to a particular base station, the terminal initiates an attach service. In this embodiment of this application, the first UE initiates the attach procedure, so that a CU-CP, a CU-UP, and a DU that serve the first UE perform the following steps to set up a tunnel between user planes.

802. The CU-CP sends a data bearer DRB setup request to the CU-UP.

In this embodiment of this application, the DRB setup request may carry a to-be-configured evolved radio access bearer E-RAB setup list, and each entry in the to-be-configured E-RAB setup list may include an E-RAB identifier, an internet protocol IP address of a core network user plane function UPF, and a tunnel identifier of the UPF, so that the CU-UP may determine, based on the to-be-configured E-RAB setup list, a core network to which the CU-UP needs to be attached, and determine an IP address and a tunnel identifier of the core network, to set up an uplink user plane tunnel between the CU-UP and the core network user plane function (User Plane Function, UPF).

In some feasible embodiments, the data bearer DRB setup request may further include security context information and a flow-level quality of service QoS list. It should be noted that the security context information includes an encryption algorithm, an integrity protection algorithm, and a security key, and the security context information is used by the CU-UP to derive a user plane encryption protection key and an integrity protection key. Each entry in the flow-level QoS list includes an RAB identifier and corresponding flow-level QoS, and the flow-level QoS list is used to notify the CU-UP of an RAB to be set up and corresponding QoS information. The DRB setup request may further include other information. This is not limited herein.

803. The CU-UP returns a DRB setup response to the CU-CP.

After receiving the DRB setup request sent by the CU-CP, the CU-UP may return the DRB setup response to the CU-CP. Specifically, the DRB setup response may include an E-RAB setup list and a to-be-configured radio bearer RB setup list, each entry in the E-RAB setup list includes an E-RAB identifier, an IP address of the CU-UP, and a tunnel identifier of the CU-UP, and each entry in the to-be-configured RB setup list includes an RB identifier, an IP address of the CU-UP, and a tunnel identifier of the CU-UP. The E-RAB setup list is used to be subsequently sent to the UPF, to set up a downlink user plane tunnel between the CU-UP and the UPF. The to-be-configured RB setup list is used to be subsequently sent to the DU, to set up an uplink user plane tunnel between the CU-UP and the DU. In some feasible embodiments, each entry in the to-be-configured RB setup list further includes a packet data convergence protocol PDCP configuration of each RB. This is not limited herein.

804. The CU-CP sends an RB bearer setup request to the DU.

805. The DU sends an RB bearer setup response to the CU-CP.

After receiving the DRB setup response returned by the CU-CP, the CU-CP may send the RB bearer setup request to the DU that serves the first UE, and the RB bearer setup request may carry the to-be-configured RB setup list, so that the DU sets up the uplink user plane tunnel to the CU-UP by using the to-be-configured RB setup list. In some feasible embodiments, the DU sends the RB bearer setup response to the CU-CP, and sets up the uplink user plane tunnel to the CU-UP by using the address and the tunnel identifier of the CU-UP in the RB bearer setup request.

806. The CU-CP sends a DRB modification request to the CU-UP.

807. The CU-UP sends a DRB modification response to the CU-CP.

In some feasible embodiments, when the CU-CP may further send the DRB modification request to the CU-UP, the DRB modification request may carry the RB setup list, and each entry in the RB setup list includes an RB identifier, an IP address of the DU, and a tunnel identifier of the DU, so that the CU-UP sets up a downlink user plane tunnel to the DU based on the RB setup list. When receiving the DRB modification request, the CU-UP may set up the downlink user plane tunnel to the DU by using the RB setup list, and return the DRB modification response to the CU-UP.

808. The CU-CP initiates an RRC configuration procedure.

In some feasible embodiments, after the user plane tunnels are set up, the CU-CP may initiate the RRC configuration procedure, so that the first UE may be connected to a network.

809. The CU-CP sends the E-RAB setup list to the UPF, so that the CU-UP sets up a downlink user plane tunnel to the UPF.

In some feasible embodiments, the CU-CP may send the E-RAB setup list to the UPF, so that the CU-UP sets up the downlink user plane tunnel to the UPF.

810. Complete a remaining attach procedure.

After all necessary user plane tunnels are set up, the first UE may complete the remaining attach procedure.

In some feasible embodiments, after the first UE completes attachment and accesses the network, if the CU-UP receives a data flow whose requirement cannot be satisfied, a bearer may be modified, to satisfy a requirement of a new data flow. Specifically, the CU-CP may create a new RB resource as a first target RB, to carry the data flow, or the CU-CP invokes an existing RB resource as the first target RB, to carry the data flow.

1. The CU-CP may create the new RB resource as the first target RB.

Figure 9:
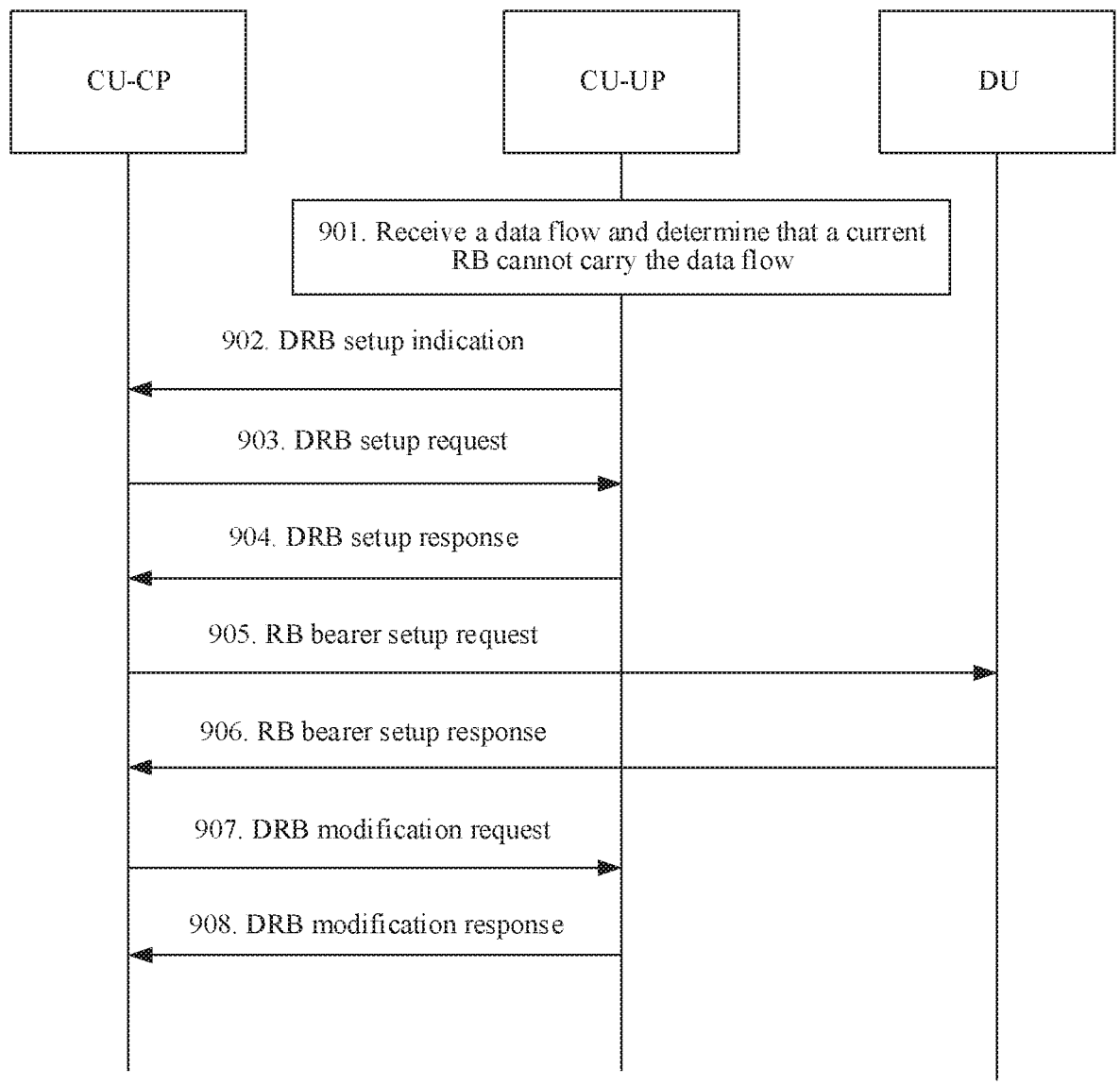
FIG. 9 is a schematic diagram of another information exchange method according to an embodiment of this application.

Referring to FIG. 9, an information exchange method provided in an embodiment of this application is applied to the foregoing various network architectures, and includes the following steps.

901. The CU-UP receives a data flow and determines that a current RB cannot carry the data flow.

In some feasible embodiments, the CU-UP may receive the data flow, and use an RB to carry the data flow. In some cases, the current RB cannot carry the received data flow because QoS may not satisfy a service requirement. This is not limited herein. In this case, a new RB needs to be created or another RB needs to be invoked to carry the data flow.

902. The CU-UP sends a DRB setup indication to the CU-CP.

When the CU-UP receives the data flow and determines that the current RB cannot carry the data flow, the CU-UP may send the DRB setup indication to the CU-CP, to request the another RB to carry the data flow. The DRB setup indication includes a QoS list (Unsatisfied Flow Level QoS List) of the data flow whose requirement cannot be satisfied, and the list includes that the current RB resource cannot carry the data flow.

903. The CU-CP sends a DRB setup request to the CU-UP.

904. The CU-UP returns a DRB setup response to the CU-CP.

In some feasible embodiments, when receiving the DRB setup indication, the CU-CP may determine a required first target RB, and send the DRB setup request to the CU-UP. The DRB setup request may include an identifier of the first target RB and data flow level QoS corresponding to the first target RB. When receiving the DRB setup request, the CU-UP may return the DRB setup response to the CU-CP. The DRB setup response may include the identifier of the target RB, an IP address of the CU-UP, and a tunnel identifier of the CU-UP.

905. The CU-CP sends an RB bearer setup request to the DU.

906. The DU sends an RB bearer setup response to the CU-CP.

When receiving an RB setup response, the CU-CP may send the RB bearer setup request to the DU. The RB bearer setup request may include the identifier of the first target RB, the IP address of the CU-UP, and the tunnel identifier of the CU-UP, so that the DU sets up an uplink user plane tunnel for the first target RB to the CU-UP. Then, the DU may send the RB hearer setup response to the CU-CP, to complete RB hearer setup.

907. The CU-CP sends a DRB modification request to the CU-UP.

908. The CU-UP returns a DRB modification response to the CU-CP.

In some feasible embodiments, the DU may send the RB bearer setup response to the CU-CP, and the RB modification request may include the identifier of the first target RB, an IP address of the DU, and a tunnel identifier of the DU, so that the CU-UP sets up a downlink user plane tunnel to the DU. Up to now, the first target RB has been newly created to carry the data flow, and both the uplink user plane tunnel and the downlink user plane tunnel between the CU-UP and the DU have been set up.

Figure 10:
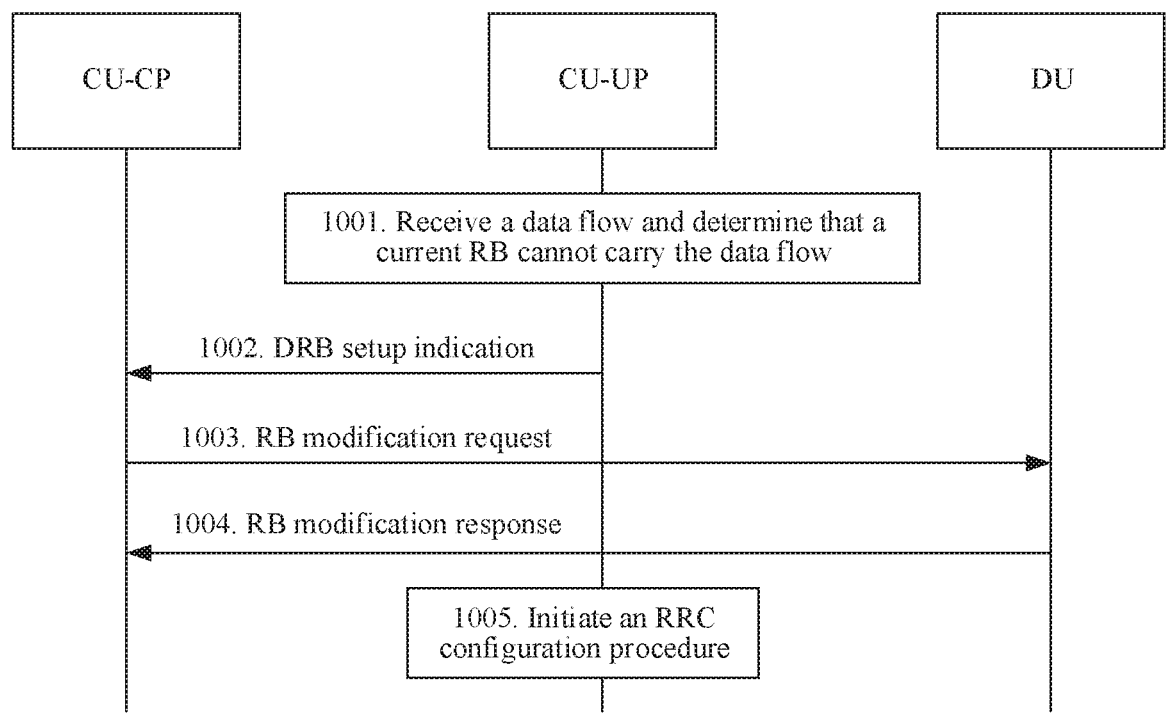
FIG. 10 is a schematic diagram of another information exchange method according to an embodiment of this application.

2. The CU-CP invokes the existing RB resource as the first target RB. Referring to FIG. 10, another information exchange method provided in an embodiment of this application is applied to the foregoing various network architectures, and includes the following steps.

1001. The CU-UP receives a data flow and determines that a current RB cannot carry the data flow.

1002. The CU-UP sends a DRB setup indication to the CU-CP.

in this embodiment of this application, step 1001 and step 1002 are the same as the foregoing step 901 and step 902. Details are not described herein again.

1003. The CU-CP sends an RB modification request to the DU.

1004. The CU-CP receives an RB modification response returned by the DU.

In this embodiment of this application, the CU-CP may invoke the existing RB resource as the first target RB, and the CU-CP sends the RB modification request to the DU. The RB modification request is used to instruct the DU to reallocate a resource, to satisfy a new QoS requirement, and instruct the DU to invoke the used first target RB to carry the data flow.

1005. The CU-CP initiates an RRC configuration procedure.

After step 1003 and step 1004 are completed, the CU-CP may re-initiate the RRC configuration procedure, so that the UE reconnects to a network by using the first target RB.

Figure 11:
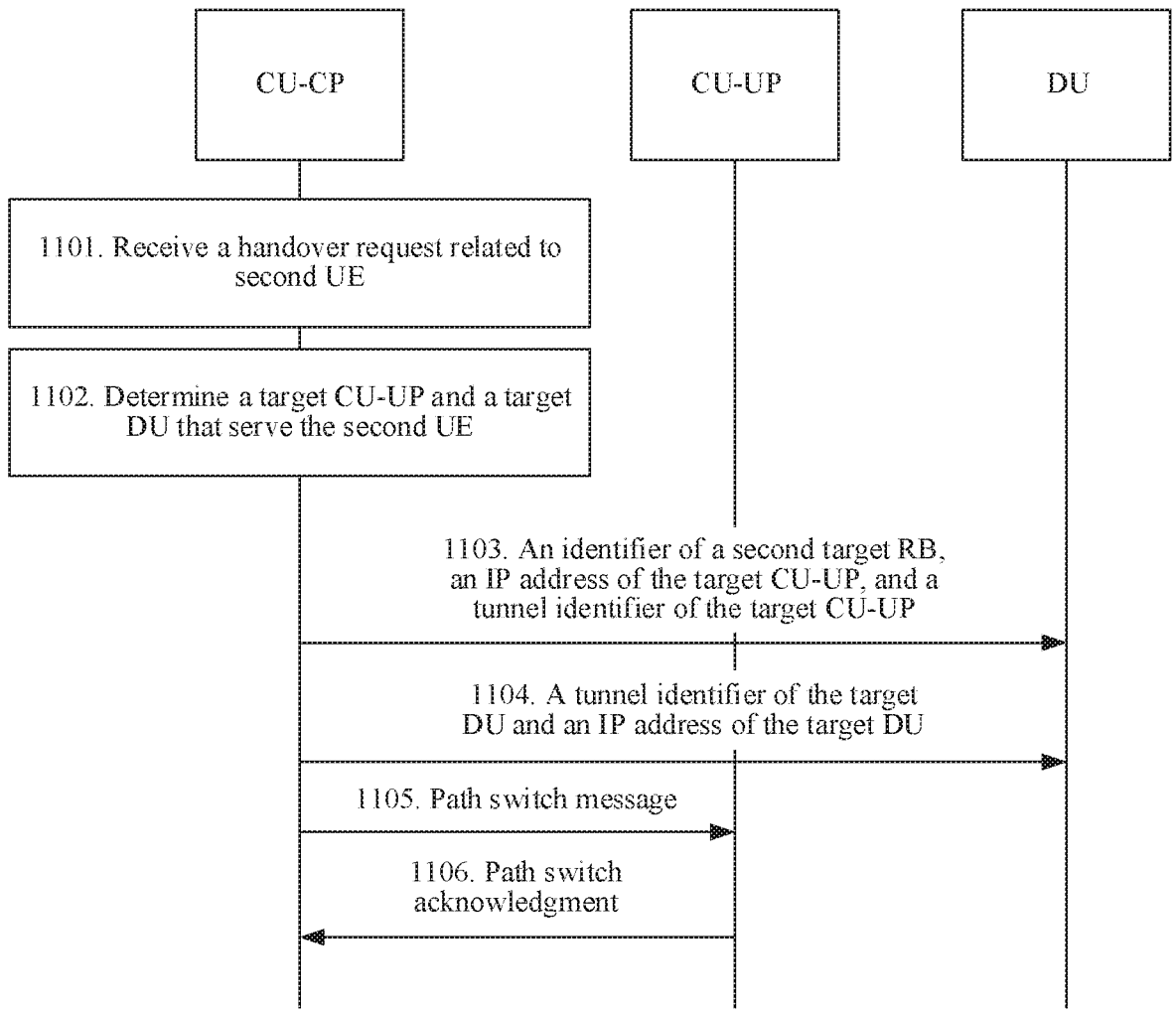
FIG. 11 is a schematic diagram of another information exchange method according to an embodiment of this application.

Referring to FIG. 11, an information exchange method provided in an embodiment of this application is used for handover of second UE, and includes the following steps.

1101. The CU-CP receives a handover request related to the second UE.

In some feasible embodiments, when the second UE is handed over from another base station to a base station in which the CU-CP is located, the CU-CP serves the second UE, and may receive the handover request of the second UE, so that a handover procedure between CU-CPs is triggered.

1102. The CU-CP determines a target CU-UP and a target DU that serve the second UE.

In this embodiment of this application, the CU-CP may determine the target CU-UP and the target DU that serve the second UE, then establish a connection to the target CU-UP and the target DU, and then set up a tunnel between the target CU-UP, the target DU, and a core network by using the following steps, so that the second UE accesses a network by using the CU-CP.

1103. The CU-CP sends an identifier of a second target RB, an IP address of the target CU-UP, and a tunnel identifier of the target CU-UP to the target DU.

In this embodiment of this application, after determining the target DU that serves the second UE, the CU-CP may send the identifier of the second target RB, the IP address of the target CU-UP, and the tunnel identifier of the target CU-UP to the target DU, and the target DU may set up an uplink user plane tunnel to the target CU-UP by using the IP address of the target CU-UP and the tunnel identifier of the target CU-UP.

1104. The CU-CP obtains a tunnel identifier of the target DU and an IP address of the target DU.

In some feasible embodiments, the CU-CP may further obtain the tunnel identifier of the target DU and the IP address of the target DU through communication with the target DU, or may obtain the tunnel identifier and the IP address of the target DU in another manner. This is not limited herein.

1105. The CU-CP sends a path switch message to the target CU-UP.

1106. The target CU-UP sends a path switch acknowledgment to the CU-CP.

In this embodiment of this application, the CU-CP may send the path switch message to the target CU-UP, and the path switch message carries the identifier of the second target RB, the IP address of the target DU, and the tunnel identifier of the target DU, so that the target CU-UP sets up a downlink user plane tunnel to the target DU, and then the target CU-UP may send the path switch acknowledgment to the CU-CP. Up to now, the uplink user plane tunnel and the downlink user plane tunnel between the target CU-UP and the target DU have been set up, and the second UE may be connected to the network by using the uplink user plane tunnel and the downlink user plane tunnel between the target CU-UP and the target DU.

It should be noted that, in some feasible embodiments, in addition to a network that protects 4G/5G, the present invention is also applicable to another communications standard that applies a similar network structure, for example, a global system for mobile communications (Global System for Mobile Communication, GSM), a universal mobile telecommunications system (Universal Mobile Telecommunications System, UMTS), or a code division multiple access (Code Division Multiple Access, CDMA) system. This is not limited herein.

Figure 12:
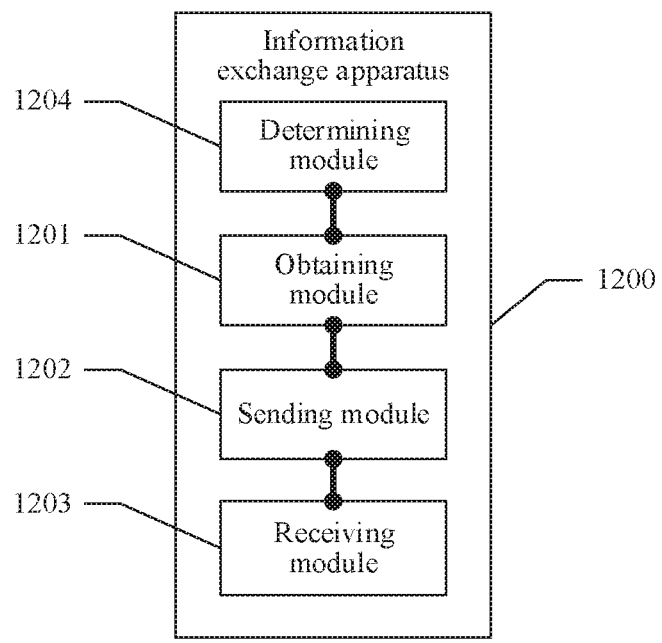
FIG. 12 is a schematic diagram of an information exchange apparatus according to an embodiment of this application.

The information exchange method is described above. Referring to FIG. 12, an information exchange apparatus 1200 provided in an embodiment of this application includes:

an obtaining module 1201, configured to obtain an address of a CU-UP, where
the obtaining module is specifically configured to obtain an address of a CU-UP by using a domain name system or an operation and maintenance system configuration;
a sending module 1202, configured to send a first link setup request to the CU-UP by using the address of the CU-UP, where the first link setup request carries an identifier of the CU-CP and/or a name of the CU-CP; and
a receiving module 1203, configured to receive a first link setup response returned by the CU-UP, where the first link setup response carries an identifier of the CU-UP and/or a name of the CU-UP, so that the CU-CP and the CU-UP complete link setup; or
the receiving module 1203 is further configured to: when the CU-UP obtains an address of the CU-CP, receive, based on the address of the CU-CP, a second link setup request sent by the CU-UP, where the second link setup request carries an identifier of the CU-UP and/or a name of the CU-UP; and
the sending module 1202 is further used by the CU-CP to return a second link setup response to the CU-UP based on the second link setup request, where the second link setup response carries an identifier of the CU-CP and/or a name of the CU-CP, so that the CU-CP and the CU-UP complete link setup.

In some feasible embodiments, the information exchange apparatus further includes:

the sending module 1202 is further configured to: when an attach procedure initiated by first UE is detected, send a data bearer DRB setup request to the CU-UP. The DRB setup request carries a to-be-configured evolved radio access bearer E-RAB setup list, and each entry in the to-be-configured E-RAB setup list includes an E-RAB identifier, an interact protocol IP address of a core network user plane function UPF, and a tunnel identifier of the UPF, so that the CU-UP sets up an uplink user plane tunnel between the CU-UP and the UPF based on the to-be-configured E-RAB setup list.

The data bearer DRB setup request may further include security context information and a flow-level quality of service QoS list. The security context information includes an encryption algorithm, an integrity protection algorithm, and a security key. The security context information is used by the CU-UP to derive a user plane encryption protection key and an integrity protection key, each entry in the flow-level QoS list includes an RAB identifier and corresponding flow-level QoS, and the flow-level QoS list is used to notify the CU-UP of an RAB to be set up and corresponding QoS information.

The receiving module 1203 is further configured to receive a DRB setup response returned by the CU-UP. The DRB setup response includes an E-RAB setup list and a to-be-configured radio bearer RB setup list, each entry in the E-RAB setup list includes an E-RAB identifier, an IP address of the CU-UP, and a tunnel identifier of the CU-UP, and each entry in the to-be-configured RB setup list includes an RB identifier, the IP address of the CU-UP, and the tunnel identifier of the CU-UP.

The sending module 1202 is further configured to send the to-be-configured RB setup list to a DU, so that the DU sets up an uplink user plane tunnel to the CU-UP by using the to-be-configured RB setup list.

The sending module 1202 is further specifically configured to send an RB bearer setup request to the DU, and the RB bearer setup request carries the to-be-configured RB setup list.

The sending module 1202 is further configured to send an RB setup list to the CU-UP, and each entry in the RB setup list includes an RB identifier, an IP address of the DU, and a tunnel identifier of the DU, so that the CU-UP sets up a downlink user plane tunnel to the DU based on the RB setup list.

The sending module 1202 is specifically configured to send a DRB modification request to the CU-UP, and the DRB modification request carries the RB setup list.

The sending module 1202 is further configured to send the E-RAB setup list to the UPF, so that the CU-UP sets up a downlink user plane tunnel to the UPF.

In some feasible embodiments, the receiving module 1203 is further configured to: when the CU-UP receives a data flow and determines that a current RB cannot carry the data flow, receive a DRB setup indication sent by the CU-UP, and the DRB setup indication is used to indicate that the current RB resource cannot carry the data flow.

In some feasible embodiments, the information exchange apparatus 1200 may create a new RB resource as a first target RB to carry the data flow.

In this case, the sending module 1202 is further configured to send a DRB setup request to the CU-UP, and the DRB setup request includes an identifier of the first target RB and data flow level QoS corresponding to the first target RB.

The receiving module 1203 is further configured to receive a DRB setup response returned by the CU-UP, and the DRB setup response includes the identifier of the target RB, the IP address of the CU-UP, and the tunnel identifier of the CU-UP.

The sending module 1202 is further configured to send the identifier of the first target RB, the IP address of the CU-UP, and the tunnel identifier of the CU-UP to the DU, so that the DU sets up an uplink user plane tunnel for the first target RB to the CU-UP.

The sending module 1202 is further configured to send the identifier of the first target RB, the IP address of the DU, and the tunnel identifier of the DU to the CU-UP, so that the CU-UP sets up a downlink user plane tunnel to the DU.

In some feasible embodiments, if the apparatus 1200 invokes an existing RB resource as the first target RB to carry the data flow, the sending module 1202 is further configured to send an RB modification request to the DU, and the RB modification request indicates that the RB is used to carry the data flow.

The receiving module 1203 is further configured to receive an RB modification response returned by the DU.

In some feasible embodiments, the receiving module 1203 is further configured to receive a handover request related to second UE.

The information exchange apparatus 1200 further includes:

a determining module 1204, configured to determine a target CU-UP and a target DU that serve the second UE.

The sending module 1202 is further configured to send an identifier of a second target RB, an IP address of the target CU-UP, and a tunnel identifier of the target CU-UP to the target DU, so that the target DU sets up an uplink user plane tunnel to the target CU-UP by using the IP address of the target CU-UP and the tunnel identifier of the target CU-UP.

The obtaining module 1201 is further configured to obtain a tunnel identifier of the target DU and an IP address of the target DU.

The sending module 1202 is further configured to send a path switch message to the target CU-UP, and the path switch message carries the identifier of the second target RB, the IP address of the target DU, and the tunnel identifier of the target DU, so that the target CU-UP sets up a downlink user plane tunnel to the target DU.

Figure 13:
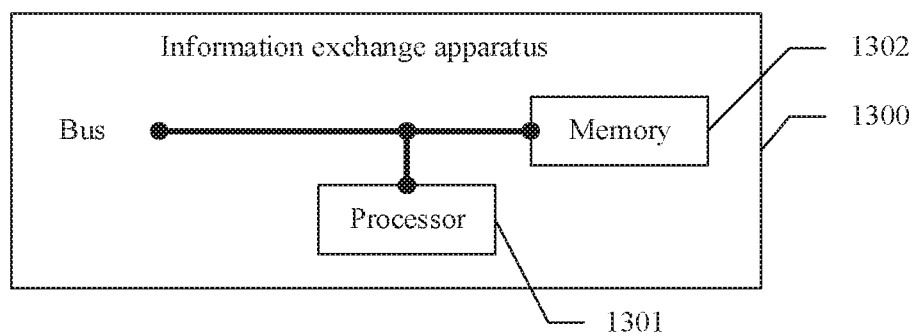
FIG. 13 is a schematic diagram of an information exchange apparatus according to an embodiment of this application.

Referring to FIG. 13, an information exchange apparatus 1300 is further provided in an embodiment of this application, including:

a processor 1301 and a memory 1302.

The memory 1302 is configured to store a program.

The processor 1301 invokes the program stored in the memory, to perform the method described in the foregoing steps.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments, Details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in one storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, and such modifications or replacements do not cause the essence of corresponding technical solutions to depart from the spirit and scope of the technical solutions of the embodiments of this application.

What is claimed is:

1. An information exchange method, comprising:
    establishing a link setup between a centralized unit-control plane (CU-CP) and a centralized unit-user plane (CU-UP) by at least one of
        obtaining, by the CU-CP, an address of the CU-UP by using a domain name system or an operation and maintenance system configuration, sending, by the CU-CP, a first link setup request to the CU-UP using the address of the CU-UP, wherein the first link setup request carries at least one of an identifier of the CU-CP or a name of the CU-CP, and receiving, by the CU-CP, a first link setup response returned by the CU-UP, wherein the first link setup response carries at least one of an identifier of the CU-UP or a name of the CU-UP; or
    receiving, by the CU-CP, a second link setup request sent by the CU-UP based on an address of the CU-CP, wherein the second link setup request carries at least one of the identifier of the CU-UP or the name of the CU-UP, and returning, by the CU-CP, a second link setup response to the CU-UP based on the second link setup request, wherein the second link setup response carries at least one of the identifier of the CU-CP or the name of the CU-CP.

2. The method according to claim 1, further comprising: obtaining, by the CU-UP, the address of the CU-CP by using the domain name system or the operation and maintenance system configuration.

3. The method according to claim 1, further comprising: after establishing the link setup between the CU-CP and the CU-UP, in response to determining that an attach procedure initiated by first user equipment (UE) is detected, sending, by the CU-CP, a data bearer (DRB) setup request to the CU-UP, wherein the DRB setup request carries a to-be-configured evolved radio access bearer (E-RAB) setup list, and each entry in the to-be-configured E-RAB setup list comprises an E-RAB identifier, an internet protocol (IP) address of a core network user plane function (UPF), and a tunnel identifier of the UPF, wherein the CU-UP sets up an uplink user plane tunnel between the CU-UP and the UPF based on the to-be-configured E-RAB setup list;

receiving, by the CU-CP, a DRB setup response returned by the CU-UP, wherein the DRB setup response comprises an E-RAB setup list and a to-be-configured radio bearer (RB) setup list, each entry in the E-RAB setup list comprises an E-RAB identifier, an IP address of the CU-UP, and a tunnel identifier of the CU-UP, and each entry in the to-be-configured RB setup list comprises an RB identifier, the IP address of the CU-UP, and the tunnel identifier of the CU-UP;

sending, by the CU-CP, the to-be-configured RB setup list to a distributed control unit (DU), wherein the DU sets up an uplink user plane tunnel to the CU-UP using the to-be-configured RB setup list;

sending, by the CU-CP, an RB setup list to the CU-UP, wherein each entry in the RB setup list comprises an RB identifier, an IP address of the DU, and a tunnel identifier of the DU, wherein the CU-UP sets up a downlink user plane tunnel to the DU based on the RB setup list; and sending, by the CU-CP, the E-RAB setup list to the UPF, wherein the CU-UP sets up a downlink user plane tunnel to the UPF.

4. The method according to claim 3, wherein the data bearer (DRB) setup request comprises security context information and a flow-level quality of service (QoS) list,
wherein the security context information comprises an encryption algorithm, an integrity protection algorithm, and a security key, and wherein the CU-UP is configured to derive, based on the security context information, a user plane encryption protection key and an integrity protection key, and
wherein each entry in the flow-level QoS list comprises a radio access bearer (RAB) identifier and corresponding flow-level QoS, and wherein the CU-UP is configured to be notified of an RAB to be set up and corresponding QoS information according to the flow level QoS list.

5. The method according to claim 3, wherein the sending, by the CU-CP, the RB setup list to the CU-UP comprises:
sending, by the CU-CP, a DRB modification request to the CU-UP, wherein the DRB modification request carries the RB setup list.

6. The method according to claim 3, wherein each entry in the to-be-configured RB setup list further comprises a packet data convergence protocol (PDCP) configuration of each RB.

7. The method according to claim 6, wherein sending, by the CU-CP, the to-be-configured RB setup list to the DU comprises:
sending, by the CU-CP, an RB bearer setup request to the DU, wherein the RB bearer setup request carries the to-be-configured RB setup list.

8. The method according to claim 3, further comprising:
receiving, by the CU-CP, a DRB setup indication sent by the CU-UP, wherein the DRB setup indication indicates that a current RB resource cannot carry a data flow received by the CU-UP, and
in response to receiving the DRB setup indication, performing, by the CU-CP, one of:
creating, by the CU-CP, a new RB resource as a first target RB to carry the data flow; or
invoking, by the CU-CP, an existing RB resource as the first target RB to carry the data flow.

9. The method according to claim 8, wherein creating, by the CU-CP, the new RB resource as the first target RB comprises:
sending, by the CU-CP, a DRB setup request to the CU-UP, wherein the DRB setup request comprises an identifier of the first target RB and data flow level QoS corresponding to the first target RB;
receiving, by the CU-CP, a DRB setup response returned by the CU-UP, wherein the DRB setup response comprises the identifier of the first target RB, the IP address of the CU-UP, and the tunnel identifier of the CU-UP;
sending, by the CU-CP, the identifier of the first target RB, the IP address of the CU-UP, and the tunnel identifier of the CU-UP to the DU, wherein the DU sets up an uplink user plane tunnel for the first target RB to the CU-UP; and
sending, by the CU-CP, the identifier of the first target RB, the IP address of the DU, and the tunnel identifier of the DU to the CU-UP, wherein the CU-UP sets up a downlink user plane tunnel to the DU.

10. An information exchange apparatus, comprising:
at least one processor; and
a non-transitory computer-readable storage medium coupled to the at least one processor and storing programming instructions for execution by the at least one processor, wherein the programming instructions instruct the at least one processor to perform one or more operations comprising:
establishing a link setup between a centralized unit-control plane (CU-CP) and a centralized unit-user plane (CU-UP) by at least one of
obtaining an address of the CU-UP using a domain name system or an operation and maintenance system configuration, sending a first link setup request to the CU-UP using the address of the CU-UP, wherein the first link setup request carries at least one of an identifier of the CU-CP or a name of the CU-CP, and receiving a first link setup response returned by the CU-UP, wherein the first link setup response carries at least one of an identifier of the CU-UP or a name of the CU-UP; or
receiving a second link setup request sent by the CU-UP based on an address of the CU-CP, wherein the second link setup request carries at least one of the identifier of the CU-UP or the name of the CU-UP, and returning a second link setup response to the CU-UP based on the second link setup request, wherein the second link setup response carries at least one of the identifier of the CU-CP or the name of the CU-CP.

11. The information exchange apparatus according to claim 10, wherein the operations further comprise:

in response to determining that an attach procedure initiated by first user equipment (UE) is detected, sending a data bearer (DRB) setup request to the CU-UP, wherein the DRB setup request carries a to-be-configured evolved radio access bearer (E-RAB) setup list, and each entry in the to-be-configured E-RAB setup list comprises an E-RAB identifier, an internet protocol (IP) address of a core network user plane function (UPF), and a tunnel identifier of the UPF, wherein the CU-UP sets up an uplink user plane tunnel between the CU-UP and the UPF based on the to-be-configured E-RAB setup list;

receiving a DRB setup response returned by the CU-UP, wherein the DRB setup response comprises an E-RAB setup list and a to-be-configured radio bearer (RB) setup list, each entry in the E-RAB setup list comprises an E-RAB identifier, an IP address of the CU-UP, and a tunnel identifier of the CU-UP, and each entry in the to-be-configured RB setup list comprises an RB identifier, the IP address of the CU-UP, and the tunnel identifier of the CU-UP;

sending the to-be-configured RB setup list to a DU, wherein the DU sets up an uplink user plane tunnel to the CU-UP by using the to-be-configured RB setup list;

sending an RB setup list to the CU-UP, wherein each entry in the RB setup list comprises an RB identifier, an IP address of the DU, and a tunnel identifier of the DU, wherein the CU-UP sets up a downlink user plane tunnel to the DU based on the RB setup list; and sending the E-RAB setup list to the UPF, wherein the CU-UP sets up a downlink user plane tunnel to the UPF.

12. The information exchange apparatus according to claim 11, wherein the data bearer (DRB) setup request comprises security context information and a flow-level quality of service (QoS) list, wherein the security context information comprises an encryption algorithm, an integrity protection algorithm, and a security key, and the CU-UP is configured to derive, based on the security context information, a user plane encryption protection key and an integrity protection key, and wherein each entry in the flow-level QoS list comprises an RAB identifier and corresponding flow-level QoS, and wherein the CU-UP is configured to be notified of an RAB to be set up and corresponding QoS information according to the flow-level QoS list.

13. The information exchange apparatus according to claim 11, wherein the operations further comprise: sending a DRB modification request to the CU-UP, wherein the DRB modification request carries the RB setup list.

14. The information exchange apparatus according to claim 13, wherein the operations further comprise:

sending an RB bearer setup request to the DU, wherein the RB bearer setup request carries the to-be-configured RB setup list.

15. The information exchange apparatus according to claim 11, wherein the operations further comprise:

receiving a DRB setup indication sent by the CU-UP, wherein the DRB setup indication indicates that a current RB resource cannot carry a data flow received by the CU-UP; and in response to receiving the DRB setup indication, performing one of:
creating a new RB resource as a first target RB to carry the data flow; or
invoking an existing RB resource as the first target RB to carry the data flow.

16. The information exchange apparatus according to claim 15, wherein creating the new RB resource as the first target RB to carry the data flow comprises:

sending a DRB setup request to the CU-UP, wherein the DRB setup request comprises an identifier of the first target RB and data flow level QoS corresponding to the first target RB;

receiving a DRB setup response returned by the CU-UP, wherein the DRB setup response comprises the identifier of the first target RB, the IP address of the CU-UP, and the tunnel identifier of the CU-UP;

sending the identifier of the first target RB, the IP address of the CU-UP, and the tunnel identifier of the CU-UP to the DU, wherein the DU sets up an uplink user plane tunnel for the first target RB to the CU-UP; and sending the identifier of the first target RB, the IP address of the DU, and the tunnel identifier of the DU to the CU-UP, wherein the CU-UP sets up a downlink user plane tunnel to the DU.

17. The information exchange apparatus according to claim 15, wherein invoking the existing RB resource as the first target RB to carry the data flow comprises:

sending an RB modification request to the DU, wherein the RB modification request indicates that the RB is used to carry the data flow; and receiving an RB modification response returned by the DU.

18. The information exchange apparatus according to claim 10, wherein the CU-UP is configured to obtain the address of the CU-CP by using the domain name system or the operation and maintenance system configuration.

19. A non-transitory computer-readable storage medium coupled to at least one processor and storing programming instructions for execution by the at least one processor, wherein the programming instructions instruct the at least one processor to perform one or more operations comprising:

establishing a link setup between a centralized unit-control plane (CU-CP) and a centralized unit-user plane (CU-UP) by at least one of
obtaining an address of the CU-UP by using a domain name system or an operation and maintenance system configuration, sending a first link setup request to the CU-UP using the address of the CU-UP, wherein the first link setup request carries at least one of an identifier of the CU-CP or a name of the CU-CP, and receiving a first link setup response returned by the CU-UP, wherein the first link setup response carries at least one of an identifier of the CU-UP or a name of the CU-UP; or
receiving a second link setup request sent by the CU-UP based on an address of the CU-CP, wherein the second link setup request carries at least one of the identifier of the CU-UP or the name of the CU-UP, and returning a second link setup response to the CU-UP based on the second link setup request, wherein the second link setup response carries at least one of the identifier of the CU-CP or the name of the CU-CP.

20. The non-transitory computer-readable storage medium according to claim 19, wherein the operations further comprise:
   in response to determining that an attach procedure initiated by first user equipment (UE) is detected, sending a data bearer (DRB) setup request to the CU-UP, wherein the DRB setup request carries a to-be-configured evolved radio access bearer (E-RAB) setup list, and each entry in the to-be-configured E-RAB setup list comprises an E-RAB identifier, an internet protocol (IP) address of a core network user plane function (UPF), and a tunnel identifier of the UPF, wherein the CU-UP sets up an uplink user plane tunnel between the CU-UP and the UPF based on the to-be-configured E-RAB setup list;
   receiving a DRB setup response returned by the CU-UP, wherein the DRB setup response comprises an E-RAB setup list and a to-be-configured radio bearer (RB) setup list, each entry in the E-RAB setup list comprises an E-RAB identifier, an IP address of the CU-UP, and a tunnel identifier of the CU-UP, and each entry in the to-be-configured RB setup list comprises an RB identifier, the IP address of the CU-UP, and the tunnel identifier of the CU-UP;
   sending the to-be-configured RB setup list to a DU, wherein the DU sets up an uplink user plane tunnel to the CU-UP by using the to-be-configured RB setup list;
   sending an RB setup list to the CU-UP, wherein each entry in the RB setup list comprises an RB identifier, an IP address of the DU, and a tunnel identifier of the DU, wherein the CU-UP sets up a downlink user plane tunnel to the DU based on the RB setup list; and
   sending the E-RAB setup list to the UPF, wherein the CU-UP sets up a downlink user plane tunnel to the UPF.

* * * * *